United States Patent Office 3,539,942
Patented Nov. 10, 1970

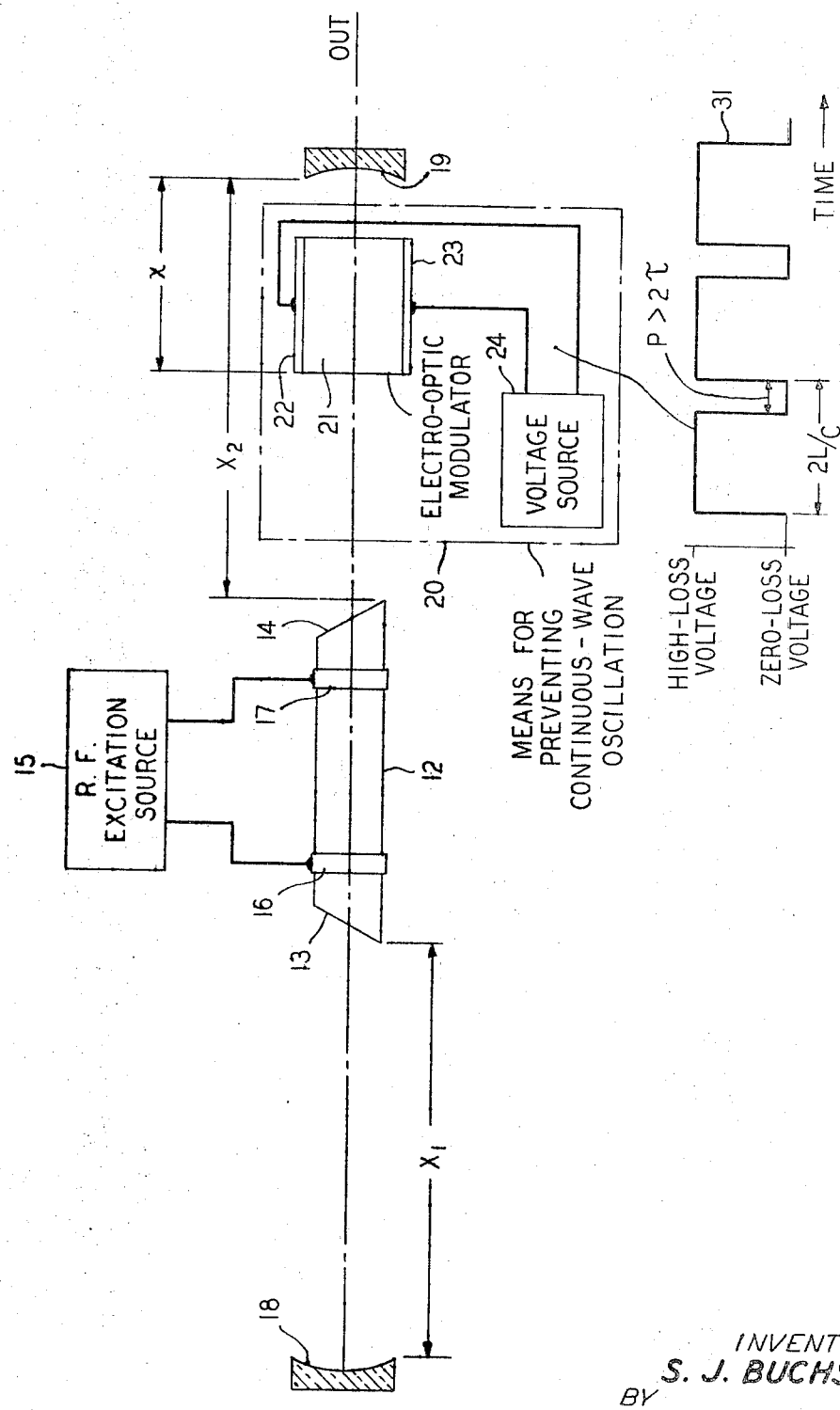

3,539,942
SELF-PULSING LASER
Solomon J. Buchsbaum, Westfield, N.J., assignor to Bell Telephone Laboratories, Incorporated, Murray Hill and Berkeley Heights, N.J., a corporation of New York
Filed Dec. 27, 1967, Ser. No. 693,871
Int. Cl. H01s 3/00
U.S. Cl. 331—94.5                1 Claim

ABSTRACT OF THE DISCLOSURE

A self-pulsing pulse-shortening laser is disclosed in which the active medium is given substantial opportunity to recover between passages of pulses and in which intracavity modulation of specialized waveshape is employed only for the purpose of inhibiting continuous-wave oscillation. The modulation occurs very close to one reflector and produces zero deviation from the desired resonance condition throughout a period that is longer than twice the maximum pulse duration but much shorter than the period between passages of the pulse through the vicinity of the one reflector.

BACKGROUND OF THE INVENTION

This invention relates to arrangements for producing pulsed outputs from laser oscillators.

A laser oscillator employs an active medium having a pair of discrete energy levels that are suitable for the stimulated emission of radiation. A laser oscillator also typically employs an optical resonator including, for example, a pair of opposed reflectors providing feedback of the coherent light to the medium to facilitate the obtaining of a gain per pass that exceeds the loss per pass. Light is said to be coherent when substantially all portions of it have a fixed or predictable phase relationship.

It has previously been observed that laser oscillators can operate in such a manner that the output consists of a train of narrow pulses. Such operation can be driven by means of intracavity perturbations, as disclosed in the copending patent application of L. E. Hargrove, Ser. No. 362,319, filed Apr. 24, 1964, now Pat No. 3,412,251, and assigned to the assignee hereof.

Similar pulsed operation has also been observed to occur spontaneously, that is, in the absence of any driving perturbation. In this case, the laser is said to be self-pulsing.

Recently, Messrs. A. G. Fox and P. W. Smith have proposed, in their article "Mode-Locked Laser and the 180° Pulse" in Physical Review Letters, 18, p. 826, May 15, 1967, that a self-pulsing laser may be operating in such a fashion that the pulse in the optical resonator is a 180° pulse. Although this terminology is borrowed from the magnetic resonance art, the analogy that appears to exist need not be discussed here. It is sufficient to define a 180° pulse as a pulse of the right intensity and duration essentially to reinvert the populations of the upper and lower laser levels. In other words, after passage of the pulse, the population of the lower level exceeds the population of the upper level by substantially the same amount as the population of the upper level exceeded the population of the lower level just before the passage of the pulse.

Typically, this regime of operation requires rather special conditions, such as a pumping level only marginally above the oscillation threshold and a relatively long optical resonator in relation to the effective length of the active medium.

A significant conclusion of the theory of Fox and Smith, in addition to explaining the prior observations, is that the product of the incident radiation intensity, I, (power per unit area), of the pulse and the pulse duration, $\tau$, should be a constant. Specifically, $$I_{\tau} = \frac{h \mu N_o L_T}{\nu} \quad (1)$$

where $h$ is Planck's constant, $\nu$ is the light frequency, $N_o$ is the population difference per unit volume at the start of the pulse, $L_T$ is the length of the laser tube and $l$ is the fractional loss per pass.

Considered by itself, this relationship would predict that, if we can enable the active medium to recover a sufficiently large population inversion between the passage of each pulse, the peak pulse power should grow; and simultaneously the pulse should become progressively narrower. Narrow pulses are desirable for optical communication systems because they can be interleaved in greater numbers per unit time than broader pulses and will enable more effective utilization of the potential communication bandwidth of the coherent light.

Unfortunately, the previously observed narrowing of pulses in the self-pulsed regime of operation has always been limited by the onset of continuous-wave oscillations as pumping power and, thus, the peak pulse power is increased.

SUMMARY OF THE INVENTION

I have recognized that improved narrowing of coherent light pulses obtained from a self-pulsing laser can be provided by inhibiting continuous-wave oscillation in a fashion that does not impair the pulse.

Specifically, according to my invention, the active medium of a laser is sufficiently separated from the reflectors of the resonator to undergo substantial recovery between passages of a pulse; and continuous-wave oscillation is inhibited by an intracavity modulation of waveshape such that zero loss and optimum conditions for oscillation exist throughout a period greater than the expected maximum pulse duration but substantially less than the pulse spacing.

In the disclosed embodiment, modulation of such waveshape is achieved by means of a square-wave electro-optic modulator. Only the portion of the modulation signal applied to the modulator during passage of the pulse need be substantially "squared" in form, in order to insure that no portion of the pulse experiences substantial loss. The remainder of the modulation wave may have any arbitrary form that provides sufficient loss in the resonator to inhibit continuous-wave oscillation.

A subsidiary feature of my invention, as applied to a laser having the linear resonator configuration, is that the modulator is disposed in close proximity to one of the reflectors and is adapted to maintain low-loss conditions in the laser for a period greater than twice the maximum pulse duration.

My invention is also applicable to ring lasers. In that case, the modulation preferably provides low-loss conditions only for a period slightly greater than the maximum pulse duration. Also, no special placement of the modulator is required.

BRIEF DESCRIPTION OF THE DRAWING

Further features and advantages of my invention will become apparent from the following detailed description, taken together with the accompanying drawing, in which the sole figure is a partially pictorial and partially block diagrammatic illustration of one embodiment of my invention.

DESCRIPTION OF ILLUSTRATIVE EMBODIMENT

In the embodiment of the figure, the laser comprises a gaseous active medium contained in a laser tube 12 having nonparallel Brewster-angle end windows 13 and 14 and excited by a continuous-wave radio-frequency excitation source 15 which is coupled to the gaseous medium through band-type electrodes 16 and 17 encircling the tube 12. The optical resonator of the laser comprises the substantially completely reflecting reflector 18 and the partially transmissive reflector 19. These reflectors 18 and 19 are spaced from the end windows 13 and 14 of the laser tube by distances $X_1$ and $X_2$, respectively, which are sufficiently large to permit substantial recovery of the gaseous active medium, during the time that the light pulse traverses the distance $2X_1$ or $2X_2$, that is, from the respective end window to the nearest reflector and back again to the window. Illustratively, the distances $X_1$ and $X_2$ are equal.

For a gaseous active medium comprising a mixture of helium and neon in proportions of approximately 10 to 1, respectively, in tube 12 and operating at a wavelength of 6328 angstrom units, the distances $X_1$ and $X_2$ are preferably greater than about 50 centimeters. The tube 12 is illustratively 100 centimeters long.

The laser also includes means 20 for preventing continuous-wave oscillation. The means or apparatus 20 includes an electro-optic modulator which is disposed in close proximity to the reflector 19 and illustratively includes the lithium tantalate active crystal 21 and suitable electrodes 22 and 23 to which a modulatnig voltage from a source 24 is applied. The optical resonator and the crystal 21 are adapted so that, in the absence of any applied voltage, the modulator provides its lowest loss for a 6328 angstrom light pulse circulating in the resonator.

The waveform of the voltage from source 24 is a unidirectional square wave for which the durations of the respective voltage values are substantially unequal. It may be seen from curve 31 in the figure that the voltage corresponding to a high loss for the circulating light pulse lasts for much longer than half of the mode-locked pulse spacing $2L/c$, where L is the distance between reflectors 18 and 19 and $c$ is the velocity of light in compatible units. The zero-loss voltage, which corresponds to constant minimum-loss transmission of all portions of the circulating pulse within the optical resonator, lasts for a period, P, that is substantially less than half of the mode-locked pulse spacing, $2L/c$, but is slightly greater than $2x/c$, where $x$ is the path length through the modulator to the reflector 19, as shown in the drawing.

In operation, random perturbations within the active medium or in the power supplied from the excitation source 15 can cause a pulse to start to form. This pulse will be most strongly reinforced on each passage through the active medium if it is a 180° pulse of the type described by Fox and Smith, above-cited. The incipient pulse can continue to grow as it circulates within the optical resonator, without the aid of any mode coupling produced by the loss modulation in apparatus 20, since the distances $X_1$ and $X_2$ are great enough to permit the active medium substantially to recover its population inversion between passages of the pulse.

The continuous-wave pumping power supplied from source 15 is substantially above that required for oscillation threshold in order to produce relatively high peak pulse powers and thus to provide substantially narrower pulses than could be obtained at lower pumping levels. Nevertheless, at this level of excitation, the laser would burst into continuous-wave oscillations which would quench the pulsing, in the absence of the means 20 for preventing continuous-wave oscillation.

Since the maximum pulse width occurs at its initial formation, and since the waveshape of the voltage from source 24 is chosen with this pulse width in mind, the zero-loss voltage, as illustrated in curve 31, is applied all during the passage of the pulse through crystal 21 to reflector 19 and back through the crystal 21. The high-loss voltage applied during the remaining time during which the pulse propagates through the active medium to reflector 18 and back is sufficient to inhibit continuous-wave oscillation at the supplied pumping power level.

An alternative way of viewing the operation of the illustrative embodiment is that the means for preventing a continuous-wave oscillation is adapted so that the entire gain curve of the active medium can be raised, as a result of increased pumping power, without experiencing continuous-wave oscillation.

It should be further noted that prior art driven schemes for producing mode-locking pulses in lasers have all employed a sinusoidal modulation waveform which experiences both positive and negative variations from the zero-loss condition for the pulse circulating in the resonator. The light pulse in those prior schemes responded to that modulation the same as if the modulation were a rectified sine wave. In such prior art arrangements, most of the pulse experiences greater loss in the resonator than is necessary. This can best be visualized by considering that a rectified sine wave has very sharp-pointed cusps near its zero value. The resultant loss imposed upon the pulse kept it from growing to a level which would produce the narrowest possible pulse, regardless of the level of pumping excitation.

More generally, placement of the apparatus 20 near a reflector is not required in all embodiments of my invention; and, for example, the placement could be arbitrary in a ring laser form of my invention. Moreover, in a ring laser, the distances $X_1$ and $X_2$ of the active medium from the nearest reflectors are no longer critical. An adequate condition for self-pulsing is then a total length of the optical resonator, less the length of the active medium, is substantially equivalent to the distances $2X_1$ or $2X_2$. Since, in such an embodiment, the circulating pulse will typically be propagating in one direction only through both the active medium and the modulator, the duration of the zero-loss voltage applied to the modulator need only be half as great as in the illustrative embodiment.

I claim:
1. A laser comprising
   an active medium capable of the stimulated emission of coherent radiation,
   means for substantially continuously pumping said medium to enable said radiation,
   a linear optical resonator disposed about said medium and comprising a pair of opposed reflectors separated from said medium by distances permitting substantial recovery of said medium between passages of a light pulse therethrough,
   means for modulating the condition of said resonator with a waveform to prevent continuous-wave oscillation and simultaneously to provide constant transmission of all portions of said pulse within said resonator, comprising
      an active modulation medium disposed in said resonator in proximity to one of the opposed reflectors and
      means for energizing said active modulation medium by a unidirectional square-wave voltage waveform having a constant value of duration greater than twice the optical pulse duration to provide said constant transmission, and
   means for extracting a portion of said radiation from said resonator.

References Cited

UNITED STATES PATENTS

| | | | |
|---|---|---|---|
| 3,414,839 | 12/1968 | Bridges et al. | 331—94.5 |
| 3,423,695 | 1/1969 | Boyden | 331—94.5 |
| 3,412,251 | 11/1968 | Hargrove. | |

RONALD L. WIBERT, Primary Examiner

P. K. GODWIN, Assistant Examiner

U.S. Cl. X.R.

250—199; 332—7.5, 7.51